(12) United States Patent
Culbert et al.

(10) Patent No.: US 9,086,864 B2
(45) Date of Patent: Jul. 21, 2015

(54) WIRELESS POWER UTILIZATION IN A LOCAL COMPUTING ENVIRONMENT

(75) Inventors: Michael F. Culbert, Monte Sereno, CA (US); Brett C. Bilbrey, Sunnyvale, CA (US); David I. Simon, San Francisco, CA (US); Peter M. Arnold, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 221 days.

(21) Appl. No.: 13/510,285

(22) PCT Filed: Nov. 10, 2010

(86) PCT No.: PCT/US2010/056240
§ 371 (c)(1),
(2), (4) Date: May 16, 2012

(87) PCT Pub. No.: WO2011/062827
PCT Pub. Date: May 26, 2011

(65) Prior Publication Data
US 2012/0303980 A1    Nov. 29, 2012

Related U.S. Application Data

(60) Provisional application No. 61/262,086, filed on Nov. 17, 2009.

(51) Int. Cl.
*G06F 1/26* (2006.01)
*H01F 38/00* (2006.01)
*H04B 5/00* (2006.01)
(Continued)

(52) U.S. Cl.
CPC ........ *G06F 1/26* (2013.01); *G06F 1/266* (2013.01); *H02J 5/005* (2013.01); *H02J 7/025* (2013.01); *H02J 7/345* (2013.01); *H04B 5/0037* (2013.01); *H02J 17/00* (2013.01); *H04B 5/0025* (2013.01)

(58) Field of Classification Search
None
See application file for complete search history.

(56) References Cited

U.S. PATENT DOCUMENTS

| | | | |
|---|---|---|---|
| 5,701,121 A | 12/1997 | Murdoch | |
| 6,028,413 A | 2/2000 | Brockmann | |

(Continued)

FOREIGN PATENT DOCUMENTS

| | | |
|---|---|---|
| CN | 1829037 | 9/2006 |
| CN | 2919568 | 7/2007 |

(Continued)

OTHER PUBLICATIONS

PCT Application No. PCT/US2011/038640—International Search Report dated Jan. 2, 2012.

(Continued)

*Primary Examiner* — Ji H Bae
(74) *Attorney, Agent, or Firm* — Downey Brand LLP

(57) ABSTRACT

Various embodiments of a wirelessly powered local computing environment are described. The wireless powered local computing environment includes at least a near field magnetic resonance (NFMR) power supply arranged to wirelessly provide power to any of a number of suitably configured devices. In the described embodiments, the devices arranged to receive power wirelessly from the NFMR power supply must be located in a region known as the near field that extends no further than a distance D of a few times a characteristic size of the NFMR power supply transmission device. Typically, the distance D can be on the order of 1 meter or so.

20 Claims, 8 Drawing Sheets

(51) Int. Cl.
*H02J 7/00* (2006.01)
*H02J 5/00* (2006.01)
*H02J 7/02* (2006.01)
*H02J 7/34* (2006.01)
*H02J 17/00* (2006.01)

(56) References Cited

U.S. PATENT DOCUMENTS

| | | | |
|---|---|---|---|
| 6,633,155 | B1 | 10/2003 | Liang |
| 6,844,702 | B2 | 1/2005 | Giannopoulos et al. |
| 6,970,142 | B1 | 11/2005 | Pleva et al. |
| 7,570,220 | B2 | 8/2009 | Hall et al. |
| 7,741,734 | B2 | 6/2010 | Joannopoulos et al. |
| 7,825,543 | B2 | 11/2010 | Karalis et al. |
| 8,198,754 | B2 | 6/2012 | Iisaka et al. |
| 8,332,547 | B2 | 12/2012 | Sugaya |
| 8,400,017 | B2 | 3/2013 | Kurs et al. |
| 8,452,235 | B2 * | 5/2013 | Kirby et al. ........... 455/41.1 |
| 8,463,332 | B2 | 6/2013 | Sato et al. |
| 8,598,747 | B2 * | 12/2013 | Bilbrey et al. ........... 307/104 |
| 2003/0214821 | A1 | 11/2003 | Giannopoulos |
| 2005/0134213 | A1 | 6/2005 | Takagi |
| 2007/0298846 | A1 | 12/2007 | Greene et al. |
| 2008/0058029 | A1 | 3/2008 | Sato et al. |
| 2008/0079396 | A1 | 4/2008 | Yamazaki |
| 2009/0058189 | A1 | 3/2009 | Cook |
| 2009/0058361 | A1 | 3/2009 | John |
| 2009/0133942 | A1 | 5/2009 | Iisaka et al. |
| 2009/0134712 | A1 | 5/2009 | Cook |
| 2009/0243394 | A1 | 10/2009 | Levine |
| 2009/0243397 | A1 | 10/2009 | Cook et al. |
| 2009/0251008 | A1 | 10/2009 | Sugaya |
| 2009/0271048 | A1 | 10/2009 | Wakamatsu |
| 2009/0284220 | A1 | 11/2009 | Toncich et al. |
| 2009/0286470 | A1 | 11/2009 | Mohammadian |
| 2009/0289595 | A1 | 11/2009 | Chen et al. |
| 2010/0007307 | A1 | 1/2010 | Baarman |
| 2010/0036773 | A1 | 2/2010 | Bennett |
| 2010/0052431 | A1 | 3/2010 | Mita |
| 2010/0148723 | A1 | 6/2010 | Cook |
| 2010/0171368 | A1 | 7/2010 | Schatz et al. |
| 2010/0181961 | A1 | 7/2010 | Novak et al. |
| 2010/0184371 | A1 | 7/2010 | Cook et al. |
| 2010/0187913 | A1 | 7/2010 | Smith et al. |
| 2010/0194334 | A1 | 8/2010 | Kirby et al. |
| 2010/0222010 | A1 | 9/2010 | Ozaki et al. |
| 2010/0244583 | A1 | 9/2010 | Shimokawa |
| 2010/0279606 | A1 | 11/2010 | Hillan et al. |
| 2010/0323616 | A1 | 12/2010 | Von Novak et al. |
| 2011/0018679 | A1 | 1/2011 | Davis et al. |
| 2012/0153732 | A1 * | 6/2012 | Kurs et al. ........... 307/104 |
| 2012/0169136 | A1 | 7/2012 | Lisi et al. |
| 2012/0187767 | A1 | 7/2012 | Kanno et al. |
| 2012/0206097 | A1 | 8/2012 | Soar |
| 2012/0217818 | A1 | 8/2012 | Yerazunis et al. |
| 2012/0262002 | A1 | 10/2012 | Widmer et al. |
| 2014/0054974 | A1 * | 2/2014 | Bilbrey et al. ........... 307/104 |

FOREIGN PATENT DOCUMENTS

| | | |
|---|---|---|
| EP | 0786835 | 7/1997 |
| EP | 0903830 | 3/1999 |
| EP | 2075667 | 7/2009 |
| EP | 2033312 | 2/2011 |
| JP | 2005151609 | 6/2005 |
| JP | 2005210843 | 8/2005 |
| JP | 2006314181 | 11/2006 |
| JP | 2009131039 | 6/2009 |
| JP | 2009251895 | 10/2009 |
| JP | 2009268311 | 11/2009 |
| WO | WO2007089680 | 8/2007 |
| WO | WO2007146164 | 12/2007 |
| WO | WO2008109489 | 9/2008 |
| WO | WO2009039113 | 3/2009 |
| WO | WO2009039115 | 3/2009 |
| WO | WO2009111597 | 9/2009 |
| WO | WO2009122355 | 10/2009 |
| WO | WO2009131990 | 10/2009 |
| WO | WO2010047850 | 4/2010 |
| WO | WO2010093967 | 8/2010 |
| WO | WO2010129369 | 11/2010 |
| WO | WO2011028956 | 3/2011 |
| WO | WO2012166126 | 12/2012 |

OTHER PUBLICATIONS

PCT Application No. PCT/US2011/038640—Written Opinion dated Jan. 2, 2012.
PCT Application No. PCT/US2011/038635—International Search Report dated Jan. 2, 2012.
PCT Application No. PCT/US2011/038635—Written Opinion dated Jan. 2, 2012.
Karalis, A. et al., "Efficient wireless non-radiative mid-range energy transfer," Annals of Physics, 323, (2008) pp. 34-48.
PCT Application No. PCT/US2011/061384—International Search Report dated Feb. 14, 2013.
PCT Application No. PCT/US2011/061384—Written Opinion dated Feb. 14, 2013.
Korean Patent Application No. 10-2013-7032979—Notice of Preliminary Rejection Feb. 21, 2014.
Taiwanese Patent Application No. 099139193—Office Action dated Feb. 12, 2014.
International Search Report dated May 5, 2011 for International Patent Application No. PCT/US2010/056240.
Chinese Application for Invention No. 201110462933.9—Second Office Action dated May 26, 2014.
Japanese Patent Application No. 2012-538950—Office Action dated Aug. 12, 2013, 8 pages.
Taiwanese Patent Application No. 099139193—Office Action dated Aug. 26, 2013, 16 pages.
Korean Patent Application No. 10-2012-7015364—Office Action dated Sep. 11, 2013, 10 pages.
European Patent Application No. 11867039.7—Office Action dated Nov. 26, 2014.
European Patent Application No. 11801889.4—Office Action dated Jun. 20, 2014.
Disclosed Anonymously, "Wireless Conductive AC/DC Power for Laptops and Other Devices", IP.com No. IPCOM000197537D, published Jul. 13, 2010 (5 pages).
PCT Application No. PCT/US2011/038641—International Search Report & Written Opinion dated Jan. 2, 2012.
PCT Application No. PCT/US2011/038633—International Search Report & Written Opinion dated Jan. 2, 2012.
Yuan, Q. et al. "Numerical Analysis on Transmission Efficiency of Evanescent Resonant Coupling Wireless Power Transfer System", IEEE Transactions on Antennas and Propagation, vol. 58, No. 5, May 2010, pp. 1751-1758.
Cannon, B.L. et al. "Magnetic Resonant Coupling as a Potential Means for Wireless Power Transfer to Multiple Small Receivers", IEEE Transactions on Power Electronics, vol. 24, No. 7, Jul. 2009, pp. 1819-1825.
IBM, "Method for Prioritizing Distribution of Wireless Electricity to Multiple Users Using a Single Power Source", IP. com No. IPCOM000188525D, published Oct. 12, 2009, pp. 1-2.
Chinese Application for Invention No. 201110462933.9—Office Action dated Dec. 20, 2013.
Chinese Application for Invention No. 201080051931.4—Office Action dated Jan. 23, 2014.

* cited by examiner

US 9,086,864 B2

WIRELESS POWER UTILIZATION IN A LOCAL COMPUTING ENVIRONMENT

TECHNICAL FIELD

The described embodiments relate generally to utilizing a wireless power transmission in a portable computing environment.

BACKGROUND

It has been discovered (see "Efficient wireless non-radiative mid-range energy transfer" by Karalis et al., Annals of Physics 323 (2008) pgs. 34-38) that useable power can be transferred wirelessly from a power source to a receiver located within a distance referred to as a near field. With wireless power transmission there is a need for apparatuses and methods for transmitting and relaying wireless power at varying power levels and multiplexed times to increase power transmission efficiency.

SUMMARY

The present invention provides a system and method for utilizing wireless near field magnetic resonance (NFMR) power transmission in a computing environment.

In various embodiments, methods, systems, and apparatus for interacting between a plurality of peripheral devices receiving power wirelessly from a wireless power supply is described. In one embodiment, a virtual charging area can be created. The virtual charging area can extend to about about one (1) meter from a central station that incorporates a NFMR power supply. The virtual charging area can define a region in which suitably configured peripheral devices, such as a mouse, keyboard, and so on can receive power by way of a NFMR channel formed between the NFMR power supply and a NFMR resonator circuit included in the peripheral device. In this way, when both the NFMR power supply and the NFMR resonator circuit are tuned to each other, then useable power can be transferred over a power conduction channel formed between the two resonant devices.

In some embodiments, at least one of the peripheral devices can have a tunable resonator circuit having at least one circuit element (such as a resistor, inductor, or capacitor) having a value that can be changed. In this way, the tunable resonator circuit can be de-coupled from the NFMR power supply by de-tuning the tunable resonator circuit in relation to the resonance frequency of the NFMR power supply. In this way, the effective Q value of the tunable circuit is reduced to the point that essentially no power is transferred. In one embodiment, at least one of the plurality of peripheral devices can include a secondary NFMR resonator circuit adapted to re-resonant power to another one of the plurality of peripheral devices by establishing a NFMR channel to the other peripheral device over which useable power can be transferred. In some embodiments, the NFMR power supply can eliminate any voids in the virtual charging area by modifying resonance characteristics such as frequency.

A method of wirelessly transmitting power can be performed by creating a first coupling mode region of an electromagnetic field within a near field of a power supply transmit antenna, coupling the electromagnetic field and a receiver antenna of a first receiver device within the coupling mode region, creating a second coupling mode region of the electromagnetic field different from the first coupling mode region within a near field of a transmit antenna of the first receiver device, coupling the electromagnetic field to a receive antenna of second receiver device in the near field of the transmit antenna of the first receiver device, wirelessly delivering power from the power supply to the first receiver device by way of the power supply transmit antenna using the first coupling mode region of the electromagnetic field; and wirelessly delivering at least some of the power wirelessly delivered to the first receiver device is wirelessly by re-transmitting the at least some power to the second receiver device by way of the first receiver transmit antenna using the second coupling mode region of the electromagnetic field.

BRIEF DESCRIPTION OF THE DRAWINGS

The included drawings are for illustrative purposes and serve only to provide examples of possible structures and arrangements for the disclosed embodiments. These drawings in no way limit any changes in form and detail that may be made to the described embodiments by one skilled in the art without departing from the spirit and scope of the embodiments.

DETAILED DESCRIPTION

Various embodiments of a wirelessly powered local computing environment are described. The wireless powered local computing environment includes at least a near field magnetic resonance (NFMR) power supply arranged to wirelessly provide power to any of a number of suitably configured devices. In the described embodiments, the devices arranged to receive power wirelessly from the NFMR power supply can be located in a region known as the near field that extends no further than a distance D that can be a few times a characteristic size of the NFMR power supply transmission device. Typically, the distance D can be on the order of 1 meter or so.

Figure 1:
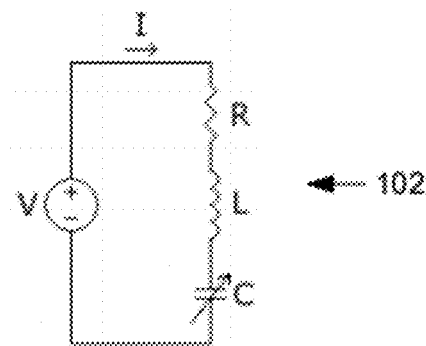
FIG. 1 illustrates representative tunable resonator circuits in accordance with the described embodiments.
Figure 1:
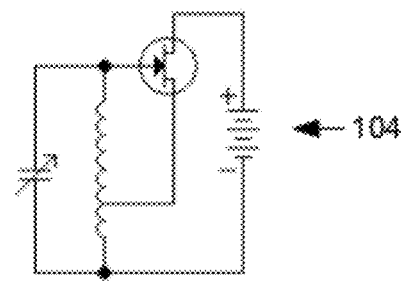
Figure 1:
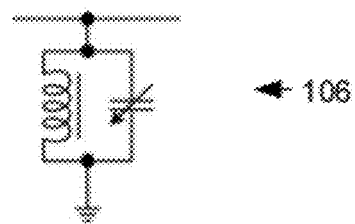

FIG. 1 shows various representative tunable circuits in accordance with the described embodiments. The representative tunable circuits can include series RLC (resistor (R), inductor (L), capacitor (C)) circuit 102. In this arrangement, a resonant frequency can be tuned (i.e., changed) by changing any of the component values. For example, circuit 102, capacitor C can be a variable capacitor used to tune circuit 102. Similarly, circuit 104 (known as a Hartlely oscillator) can be used as a tunable circuit in the described embodiments as can tuned LC circuit 106.

Figure 2:
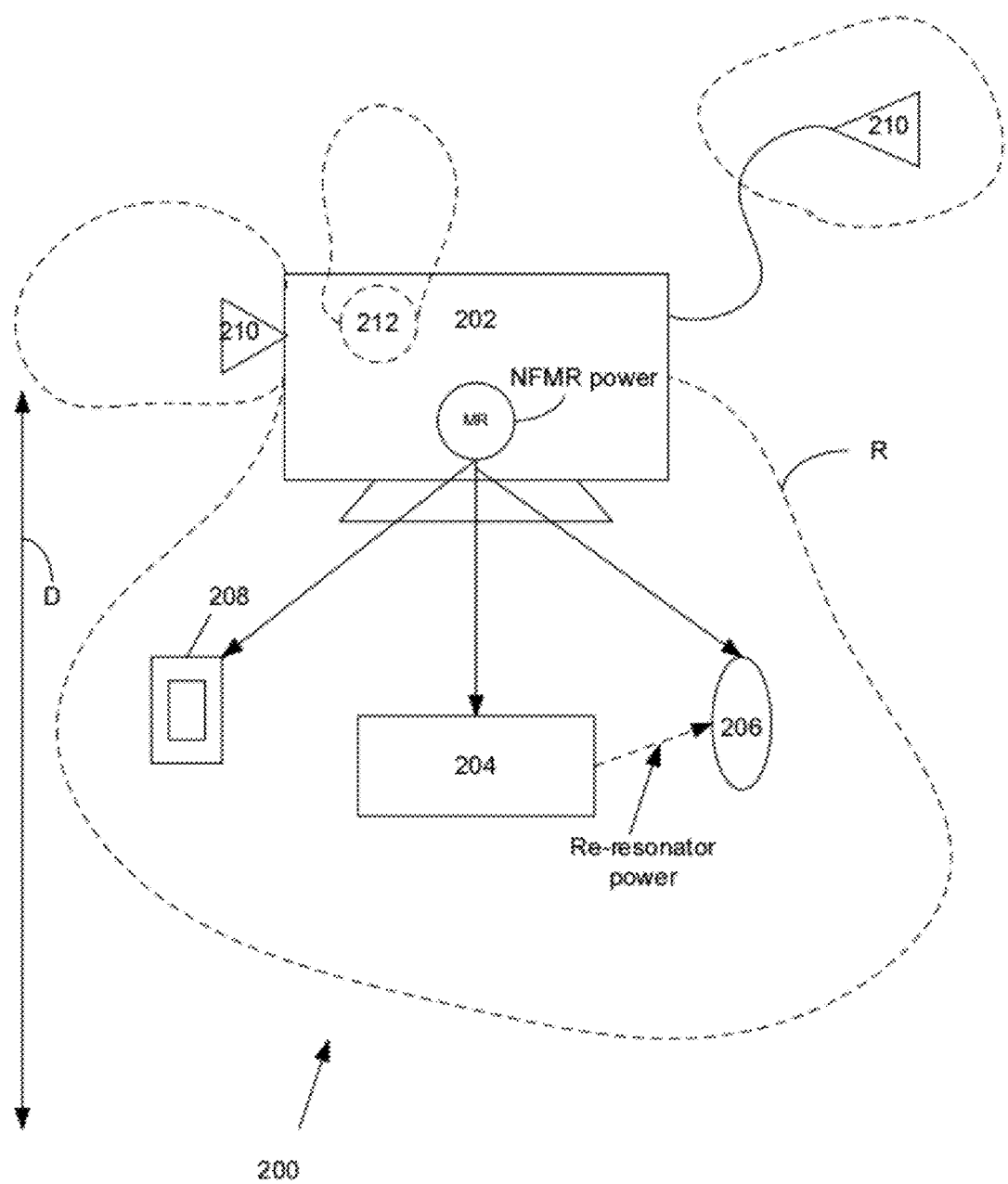
FIG. 2 shows representative virtual charging area in accordance with the described embodiments.

FIG. 2 shows representative virtual charging area 200 in accordance with the described embodiments. Virtual charging area 200 provides region R of charging for suitably configured devices placed within the region R. NFMR power supply can be placed in central unit such as desktop computer. In this way, the desktop computer can provide the NFMR power supply with computing resources. It should be noted that the near field magnetic resonance (NFMR) power supply can include high Q circuit that relies upon near field magnetic coupling by way of a resonance channel formed between resonances of the power source and sink to transfer power. The NFMR power supply can be a standalone unit such as, for example, included in a desk top computer, laptop computer, tablet computer, and so on. In other embodiments, the NFMR power supply can take the form of a portable type unit such as a dongle that can be connected to a legacy device such as a desktop computer thereby providing the ability to retrofit devices. In still other embodiments, housing or a portion of a housing used to enclose the NFMR power source can act to extend a useful range of the NFMR power supply.

In this way, suitably configured peripheral devices can be powered directly from the NFMR power supply. In so doing, the peripheral devices when tuned to the appropriate frequency can receive power wirelessly from the NFMR power supply. In so doing, the appropriately tuned peripheral device can be considered to be part of a resonance circuit that can include the NFMR power supply and any other peripheral devices so tuned. As part of such a circuit, each device has associated with it a corresponding load that can be sensed by the NFMR power supply. As such, the resonance circuit can have a characteristic load that can change by the addition or deletion of devices from the resonance circuit. For example, if a suitably configured device such as a portable media player is brought within range of the NFMR power supply, then the load associated with the portable media player can be sensed by the NFMR power supply when (and if) the portable media player is appropriately tuned. It should be noted that in some cases, the device being brought into the range of the NFMR power supply can communicate its initial presence using a standard communication protocol such as WiFi or Bluetooth. However, once incorporated into the resonance circuit, the device can use a communication back channel described in detail below. Accordingly, any change in the characteristic load factor of the resonance circuit can convey information that can be used by the NFMR power supply to control the various devices in the resonance circuit by, for example, distributing power, and so on.

In some embodiments, certain of the peripheral devices can be configured to include a re-resonator circuit that can receive power directly from the NFMR power supply. Such devices can also transfer a portion of the power received to other of the peripheral devices. For example, as shown in FIG. 2 virtual charging area 200 includes central unit 202 (desktop computer) that can include the NFMR power supply, keyboard 204, mouse 206, and portable media player 208. In one embodiment, keyboard 204 can be configured to receive power directly from the NFMR power supply included in desktop computer 202 as can mouse 206 and portable media player 208 (when located within range R).

In some cases, the ability of desktop computer 202 to provide power directly to mouse 206, for example, can be reduced due to any number of factors. Such factors can include, for example, the addition of other devices into region R that require power from the NFMR power supply, obstacles interfering with the direct power channel formed between the NFMR and mouse 206, and so on. In this case, keyboard 204 can act as a re-resonator such that a portion of the power delivered to keyboard 204 from the NFMR power supply can be passed on by way of a re-resonator transmission unit (not shown) in keyboard 204. In this way, any power loss experienced by mouse 206 can be ameliorated by the power received from keyboard 204. This arrangement can be transitory or can last for as long as mouse 206 is not able to receive adequate power directly from the NFMR power supply. In other cases, the locating of portable media player 208 within region R can reduce the amount of power available to keyboard 204 and mouse 206. In this case, if a battery in keyboard 206 is fully charged (or additional charge is not necessary) then keyboard 206 can decouple a charging circuit while still maintaining a re-resonator circuit providing power to mouse 206.

In some embodiments, dongle 210 can be connected to desktop computer 202 (by way of a USB port or cable, for example). So connected, dongle 210 can, in turn, act as a range extender for the NFMR power supply. In this way, dongle 210 can extend a range that power can be provided by the NFMR power supply included in desktop computer 202. In some cases, dongle 210 can re-resonate power already received from the NFMR power supply while in other cases, dongle 210 can include its own NFMR power supply. By having its own NFMR power supply, dongle 210 can provide additional power wirelessly to those devices within virtual charging region 200 separate from the power provided by the NFMR power supply included in desktop 202. It should be noted that in some embodiments, the housing of desktop computer 202 (or a portion thereof) can be used as a resonator as part of the NFMR power supply.

Figure 3:
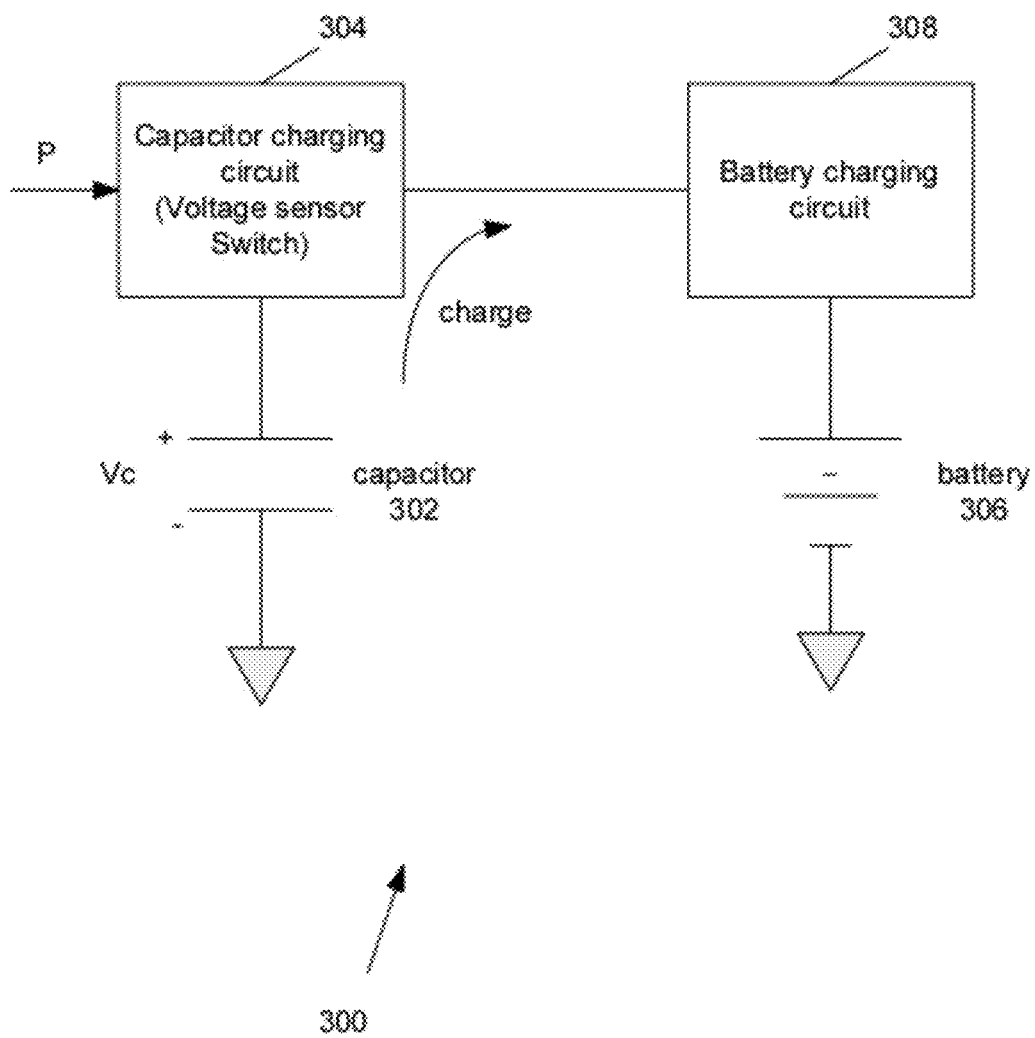
FIG. 3 shows representative hybrid power circuit in accordance with the described embodiments.

FIG. 3 shows representative hybrid power circuit 300 in accordance with the described embodiments. As described, hybrid power circuit 300 can match the low power delivery capability of the NFMR power supply to a large power requirement of required for long term storage devices, such as lithium ion polymer (LiPO) battery. Batteries in such devices as portable phones, portable media players, and so on, can require relatively large amount of power to charge that can be greater than that available from the NFMR power supply. Therefore, it is difficult to charge these high capacity batteries such as LiPO using the NFMR power supply. However, a short term charge storage device (such as a capacitor, ultra capacitor, and so on) that can be charged up by power delivered by the NFMR power supply can be used to temporarily store charge prior to being passed to the battery. In this way, once sufficient charge is stored in the short term charge storage device, the stored charge can be used to charge a long term charge storage device (such as a LiPO battery). For example, FIG. 3 shows representative hybrid power circuit 300 having capacitor 302, capacitor charging circuit 304 (that can receive power P from the NFMR power supply), long term power storage unit 306 (that can take the form of battery 306), and battery charging circuit 308. In the described embodiment, power P provided by the NFMR power supply can "trickle" charge capacitor 302. Once sufficient charge is stored in capacitor 302, capacitor charging circuit 304 can sense capacitor voltage VC and switch fully charged capacitor 302 to battery 306 by way of battery charging circuit 308. In this way, charge Q stored in capacitor 302 can be used to increase the charge of battery 306. Once capacitor 302 is discharged (as determined by capacitor charging circuit 304), capacitor 302 can again receive power P from the NFMR power supply.

One of the advantages of a wirelessly powered local computing environment is the potential to provide an enhanced user experience. For example, by doing away with clumsy and annoying cables and eliminating the need to replace batteries, an easy to use and efficient local computing environment can be provided to the user. However, in order to provide this enhanced user experience, it would be advantageous for the various devices that make up the wirelessly powered local computing environment to be able to interact with each other as well as with the NFMR power supply. Such interaction can include, for example, providing power by the NFMR power supply to any of the devices within range in whatever amount is required. For example, an amount of power transferred between the NFMR power supply (having a first resonator circuit) and receiving device (having a second resonator circuit) can be controlled by tuning (or de-tuning) the second resonator circuit along the lines described above. It should be noted that when a device is tuned, the tuned device can become part of the resonance circuit. As part of the resonance circuit, a load associated with the device can be "seen" by the NFMR power supply. This load can, in turn, be used by the NFMR power supply to determine the power requirements of the resonance circuit as well as how the required power must be distributed amongst the various devices included in the resonance circuit. On the other hand, when a device "de-tunes", then the device no longer resonates with the NFMR power supply and is effectively removed from the resonance circuit and receives little or no additional power.

It should be noted that various environmental factors can have an effect on the efficiency of power transfer from the NFMR power supply to those devices included in the resonance circuit. For example, any object (metallic, for example) that can interfere with the magnetic coupling between the NFMR power supply and those device wirelessly receiving power can adversely affect both the amount of power supplied and the efficiency of the power transfer. This reduction in power transferred or power transfer efficiency can put an undue strain on the NFMR power supply as well as increase the likelihood that particular devices may not have sufficient power to operate at peak efficiency, to execute important functions, or in some cases, not be able to operate at all. In one embodiment, feedback provided by a device to the NFMR power supply indicating that the device requires more power or has experienced a reduction in power can cause the NFMR power supply to try to ascertain the reason or reasons why the device has experienced this reduction in power. For example, if the device is moving within a void region (a void being defined as that region having a substantially reduced power transmission or efficiency factor), then the NFMR power supply can attempt to move the void region by modifying selected resonance factors (such as resonance frequency) thereby having the effect of moving the void region (hopefully beyond the range of the operating region of the devices wirelessly coupled to the NFMR power supply). In one embodiment, the NFMR power supply can determine that the power transfer efficiency has dropped below a threshold for a device(s) based upon, for example, feedback from the affected device(s). In response, the NFMR power supply can respond by modifying the frequency of the magnetic resonance signal until the power efficiency has recovered to above the threshold, by increasing power, or by, in some cases, causing less important or less used devices, to de-tune themselves (thereby removing themselves from the resonance circuit) so as to free up power that can be provided to those devices requiring more power. It should be noted that these operations can be carried out in the background in such a way that the user is unaware of the operations taking place. In still another embodiment, the power source can alter phase, frequency and or signal amplitude relative to other links in order to optimize power delivery.

In order to provide more robust communication between the various devices coupled with the NFMR power supply, each device can provide affirmative feedback to the NFMR power supply using a direct communication channel such as Bluetooth or WiFi. It should be noted, however, that an indirect communication channel can also be used. Such an indirect communication channel can be formed using the resonance circuit load factor mediated by the number (and type) of devices wirelessly coupled with the NFMR power supply.

Since each device has an associated resonance load (i.e., load perceived by the NFMR power supply when a device is tuned to the proper resonance frequency), an indirect communication channel mediated by load state of the device, or devices in the resonance circuit can be established with the NFMR power supply. For example, the NFMR power supply can characterize a particular load state of a resonance circuit by ascertaining the overall resonance load (i.e., sense load on resonant circuit). Any changes to the load state can indicate a change in the status of the resonance circuit which, in turn, can infer that one or more of the devices previously included in the resonance circuit (i.e., tuned to the NFMR power supply resonant frequency) has dropped out, or de-tuned. In some cases, a Morse code like communication protocol can be established between the NFMR power supply and each of the devices. This Morse code like communication protocol can be based upon a device tuning and de-tuning itself using an identifiable pattern. In this way, a simple device identifier, for example, can be communicated to the NFMR power supply. Using this arrangement, a device that has determined to de-tune itself and to remove itself from the resonance circuit, can signal the NFMR power supply its intent as well as identify itself. In this way, the NFMR power supply can have a more clear understanding of the condition of the resonance circuit and the devices included therein. This device to device communication channel (also referred to as a back channel) can be capable of communicating simple information. Such information can include, for example, a device identifier, a synchronization flag, and so on. It should be noted that this communication channel is independent and separate from other communication channels provided by, for example, WiFi or Bluetooth.

For example, if keyboard is using power wirelessly provide by the NFMR power supply to charge its battery, when the keyboard determines that the battery is substantially fully charged, then the keyboard can determine that power from the NFMR power supply is no longer required (at least until the battery discharges to a pre-set level). In this case, the keyboard can notify the NFMR power supply that it no longer requires power (or at least until it signals that it requires power at some future point in time). In this case, the NFMR can redirect power away from the keyboard (using, for example, a different resonant frequency when the NFMR power supply is equipped to transmit power on a number of frequency ranges, or bands) or the keyboard can remove itself from the resonance circuit (either on its own or as directed) by de-tuning itself. In this way, the load of the resonance circuit can be reduced allowing more power to be wirelessly delivered to the other devices in the resonance circuit. It should be noted that for efficiency and environmental reasons, the NFMR power supply will provide only as much power as is needed. For example, as battery charges up then less power is required. In this way, the charge state of the battery can be communicated to the NFMR power supply that can respond by reducing, or throttling back, the power provided to the keyboard.

It should be noted that while a device can be removed from the resonance circuit by the process of de-tuning, the device can be added to the resonance circuit by tuning it. By tuning (and conversely de-tuning) it is meant that circuit characteristics (such as resistance) can be changed resulting in the circuit Q increasing in the case of tuning or decreasing in the case of de-tuning. It should be noted that the relative increase or decrease in Q for a circuit can be dependent upon the circuit and applications to which the circuit is used.

When a device is brought within range R of the power supply, then the load experienced by the power supply increases by that amount corresponding to the device. In this way, proximity detection can be thought as having taken place that can trigger an action to be taken. For example, if a portable media player is brought within range R of a desktop computer, then the proximity signal generated by the change in load experienced by the power supply can cause the desktop computer to initiate a synchronization process, for example, between the portable media player and the desktop computer.

The communication channels established between the various devices in the resonance circuit can be used for the devices to determine amongst themselves which device takes priority with regards to power supplied by the NFMR power supply. In other cases, a host device (that includes the NFMR power supply and any associated computing resources) can act as aggregator. By aggregator, it is meant that the host device can determine the priority of those devices for receiving power, how much power to receive, and for how long. It should be noted that some devices and or some operations performed by a device can have a higher priority than other devices and or operations. For example, a high priority device(s) may require guaranteed power for operation (such as using a mouse vs charging a portable media player). The host device can use any suitable priority mechanism (round robin, for example).

In another embodiment, the devices receiving power can communicate amongst themselves to determine which device has priority. The devices understand their own operating points, such as a minimum amount of power to perform certain function, maximum power required to perform all functions. In this way, each device can provide a desired amount of power, a list of functions that can be performed, and a minimum amount of power required for operation. The source can determine how much power can be delivered and which device can get the power it needs. In some cases, the devices themselves set the priority, in other cases, the host device sets the priority. When a device is not receiving power, it removes itself from the resonance circuit by de-tuning, and returns to the circuit by re-tuning.

It should be noted that the NFMR power supply can use any number of protocols to wirelessly provide power to the various devices included in the resonance circuit. For example, the NFMR power supply can include a plurality of resonator circuits each arranged to resonate at a particular frequency. In this way, the NFMR power supply can provide power orthogonally using different frequency bands. In this way, a device can have multiple resonant frequencies in order to take advantage of the frequency bands provided by the NFMR power supply. For example, the NFMR power supply can wirelessly provide power using multiple frequency bands where a number of devices can each tune themselves to a particular frequency. In this way, frequency shifting techniques can be used to more efficiently transfer power to the plurality of devices within range of the NFMR power supply.

Figure 4:
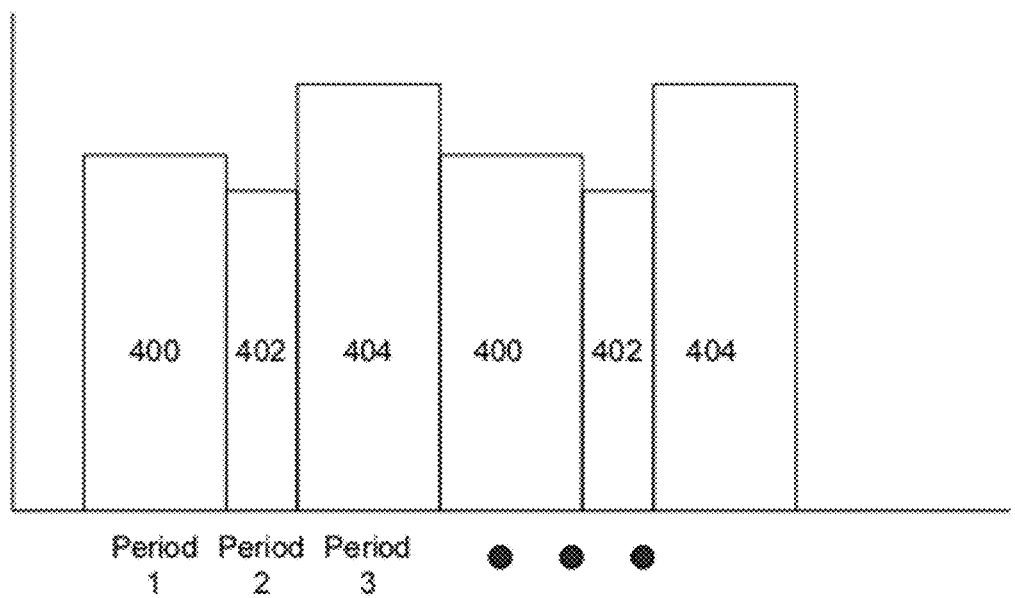
FIG. 4 shows representative time multiplexing for distributing power in accordance with the described embodiments.

Other mechanisms for a single NFMR power supply to independently transmit power to more than one device includes time multiplexing as shown in FIG. 4. As illustrated, devices 400, 402 and 404 can each take turns tuning and de-tuning themselves such that at any one time only one of the devices if receiving power. For example, during a period 1, device 400 receives power by tuning itself to at least one of the available resonant frequencies while devices 402 and 404 are de-tuned. Once device 400 has completed its power cycle, device 400 de-tunes itself and device 402 tunes itself and receives power wirelessly from the NFMR power supply. Once device 402 completes its power cycle, device 402 de-tunes itself and device 404 tunes itself to at least one of the resonance frequencies to receive power from the NFMR power supply. In other embodiments, the NFMR power supply can use frequency multiplexing in which the NFMR can toggle amongst a number of frequencies each one tuned to a particular device. The device can receive power only when the device resonates with a current frequency of the power supply.

The closed loop control can also affect the modes of operation of the devices in the resonance circuit. For example, a keyboard can determine an amount of power received from the source which will depend upon the distance between the source and the keyboard (as well as the presence of any interfering objects). If the power received falls below a threshold, then the keyboard can use more battery power or request that the source increase power. In some cases, if the power provided can not be increased to meet the current operating requirements of the keyboard, then the keyboard can take action to reduce its power requirements by, for example, reducing backlight, etc. It should be noted that as discussed above, the reduction on power received by the keyboard can be caused by many other factors other than an increase in distance. Such factors can include, for example, the presence of voids, objects, other devices added to the circuit, and so on.

Figure 5:
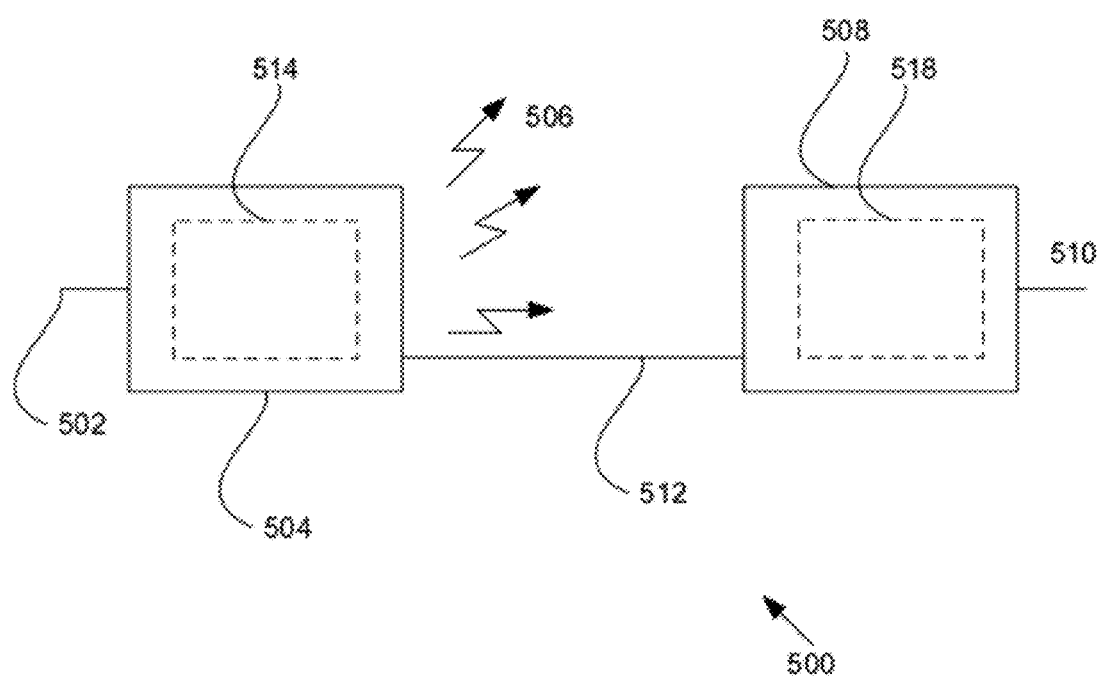
FIG. 5 illustrates a wireless transmission system.

FIG. 5 illustrates a wireless transmission system 500. Input power 502 is provided to a transmitter 504 for generating a magnetic field 506 for providing energy transfer to receiver 508 that generates an output power 510 where the transmitter 504 and the receiver 508 are separated by a distance 512. When the frequency of receiver 508 and the frequency of transmitter 504 are resonant, transmission losses between the transmitter 504 and the receiver 508 are minimal.

An efficient energy transfer occurs by coupling a large portion of the energy in the near-field of the transmitter 504 antenna to the receiver 508 antenna rather than propagating most of the energy in an electromagnetic wave to the far field. The area around the transmitter antenna 514 and receiver antenna 518 with this near-field coupling is referred to as a coupling-mode region.

Figure 6:
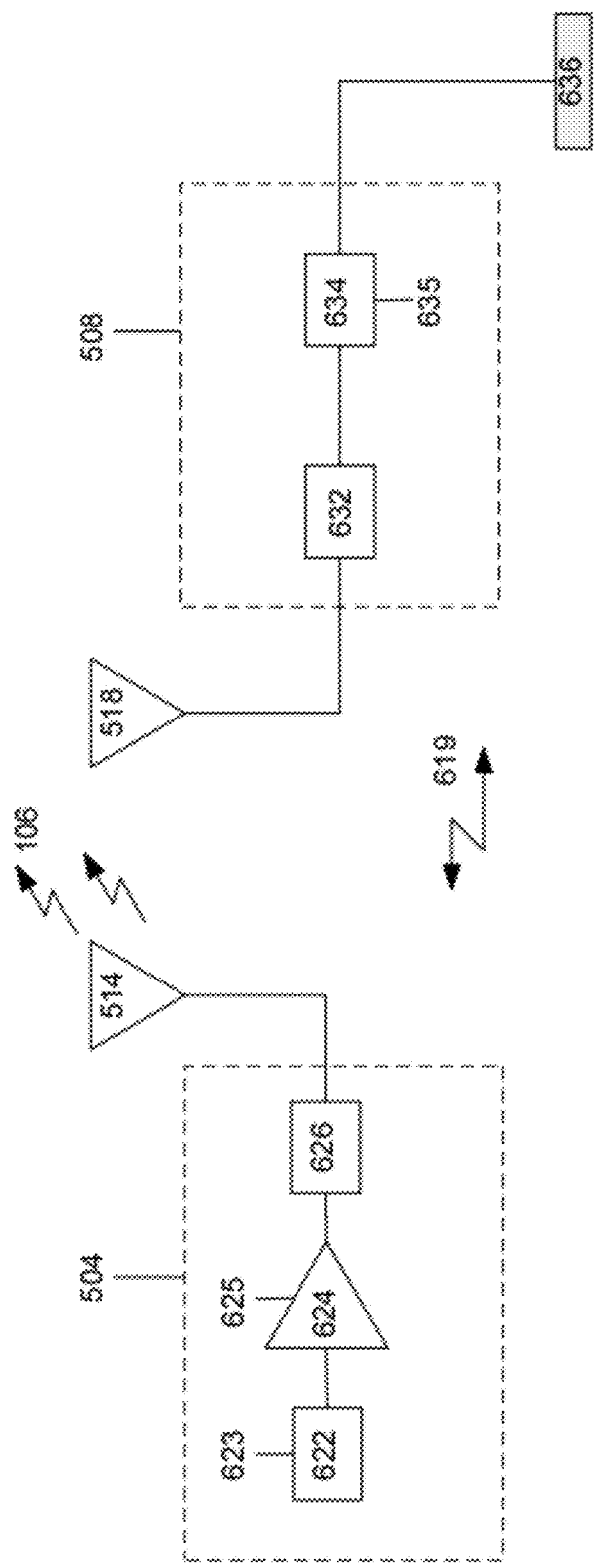
FIG. 6 shows a simplified schematic diagram of a wireless power transfer system.

FIG. 6 shows a simplified schematic diagram of a wireless power transfer system that includes transmitter 504 having an oscillator 622 that generates a desired frequency varied by signal 623, a power amplifier 624 and a filter and matching circuit 626 and responsive to control signal 625. The filter and matching circuit 626 can be included to filter out harmonics or other unwanted frequencies and match the impedance of the transmitter 504 to the transmit receiver antenna 514.

The receiver 508 can include a matching circuit 632 and a rectifier and switching circuit 634 to generate a DC power output in response to signal 635 to charge a battery 636 as shown in FIG. 6 or power a device coupled to the receiver 508 (not shown). The matching circuit 632 can be included to match the impedance of the receiver 508 to the receive antenna 518. The receiver 508 and transmitter 504 can communicate on a separate communication channel 619 (e.g., Bluetooth, cellular, etc).

Figure 7:
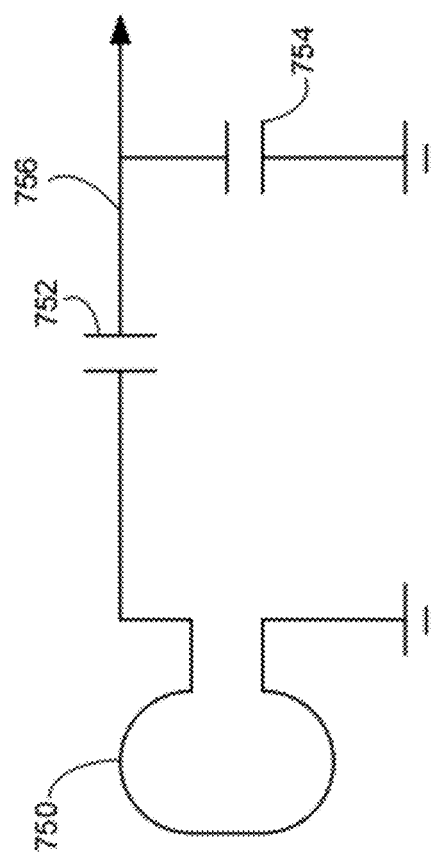
FIG. 7 shows an exemplary antenna.

FIG. 7 shows antenna 750. The resonant frequency of antenna 750 is based on inductance and capacitance. Inductance in antenna 750 is generally the inductance created by the antenna, whereas, capacitance is generally added to the inductance of antenna 750 to create a resonant circuit at a desired resonant frequency. For example, capacitor 752 and capacitor 754 can be added to antenna 750 to create a resonant circuit that generates resonant signal 756.

Figure 8:
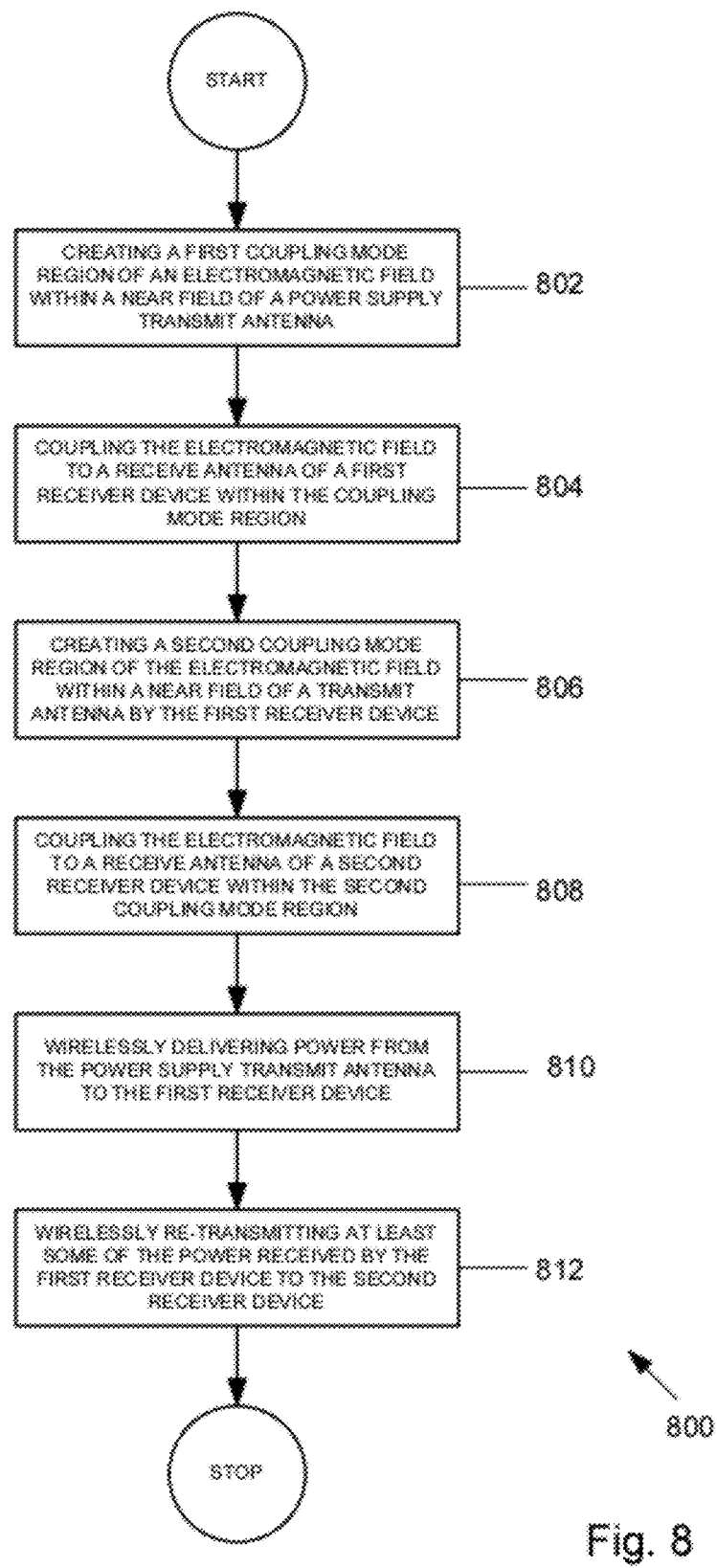
FIG. 8 shows a flowchart detailing process 800 in accordance with the described embodiments.

FIG. 8 shows a flowchart detailing process 800 in accordance with the described embodiments. Process 800 can begin at 802 by creating a first coupling mode region of an electromagnetic field within a near field of a power supply transmit antenna. Next at 804, the electromagnetic field and a receiver antenna of a first receiver device are coupled with the coupling mode region. At 806, a second coupling mode region of the electromagnetic field different from the first coupling mode region is created with a near field of a transmit antenna of the first receiver device. At 808, the electromagnetic field is coupled to a receive antenna of second receiver device in the near field of the transmit antenna of the first receiver device. At 810, power is wirelessly delivered from the power supply to the first receiver device by way of the power supply transmit antenna using the first coupling mode region of the electromagnetic field. At 812, at least some of the power wirelessly delivered to the first receiver device is wirelessly re-transmitted to the second receiver device by way of the first receiver transmit antenna using the second coupling mode region of the electromagnetic field.

What is claimed is:

1. A method of wirelessly transmitting power, comprising:
   at a wireless power supply:
   coupling a first electromagnetic field of the wireless power supply and a first device;
   coupling a second electromagnetic field to a second device, wherein the first device is communicatively coupled to the second device;
   causing a resonant circuit of the first device to tune and detune to at least one of multiple frequency bands of the wireless power supply;
   receiving load states from the first device and the second device;
   wirelessly distributing power to the first device and the second device in accordance with the load states, wherein at least a portion of the power received by the first device is wirelessly provided to the second device; and
   when an updated load state is communicated between the first device and the second device:
   causing a wireless redistribution of the power between the first device and the second device based on the updated load state.

2. The method as recited in claim 1, the method further comprising: receiving an initial communication from the first device via a wireless networking protocol for indicating a presence of the first device to the wireless power supply.

3. The method as recited in claim 1, further comprising: establishing a communication channel between the first device and the second device based on the load states.

4. The method as recited in claim 3, wherein establishing the communication channel between the first device and the second device comprises determining a code pattern based on tuning and detuning between the first device and the second device.

5. A computing device, comprising:
   a processor; and
   a memory storing instructions that when executed by the processor cause the computing device to perform steps that include:
   coupling a first electromagnetic field of the computing device to a first device;
   coupling a second electromagnetic field of the computing device to a second device, wherein the first device is communicatively coupled to the second device;
   causing a resonant circuit of the first device to tune and detune to at least one of multiple frequency bands of the computing device;
   receiving load states from the first device and the second device;
   wirelessly distributing power to the first device and the second device in accordance with the load states, wherein at least a portion of the power received by the first device is wirelessly provided to the second device; and
   when an updated load state is communicated between the first device and the second device:
   causing a wireless redistribution of the power between the first device and the second device based on the updated load state.

6. The computing device as recited in claim 5, wherein the steps further include:
   receiving an initial communication from the first device via a wireless networking protocol for indicating a presence of the first device to the computing device.

7. The computing device as recited in claim 5, wherein the steps further include:
   establishing a communication channel between the first device and the second device based on the load states.

8. The computing device as recited in claim 7, wherein establishing the communication channel between the first device and the second device comprises determining a code pattern based on tuning and detuning between resonant circuits of the first device and the second device.

9. An apparatus, comprising:
   a resonant circuit;
   a processor; and
   a memory storing instructions that when executed by the processor cause the apparatus to perform steps that include:
   coupling a first electromagnetic field of a first device and the apparatus;
   communicatively coupling to a second device, wherein the second device is coupled to the first device via a second electromagnetic field;
   causing the resonant circuit of the apparatus to tune and detune to at least one of multiple frequency bands of the first device;
   providing a load state to the first device;
   receiving, based on the load state, wireless power from the first device;
   providing wireless power to the second device; and
   when an updated load state is received from the second device:
   causing a wireless redistribution of the power between the apparatus and the second device based on the updated load state.

10. The apparatus as recited in claim 9, wherein the steps include:
    establishing a communication channel between the apparatus and the second device by determining a code pattern, wherein the code pattern is based on tuning and detuning between resonant circuits of the apparatus and the second device.

11. The apparatus as recited in claim 9, wherein the steps further include:
    providing feedback to the first device indicating that a power transfer efficiency has dropped below a threshold.

12. A method of wirelessly transmitting power, comprising:
    at a wireless power supply:
    coupling a first electromagnetic field to a first device;
    coupling a second electromagnetic field to a second device, wherein the first device is communicatively coupled to the second device;
    receiving load states from the first device and the second device;

wirelessly distributing power to the first device and the second device in accordance with the load states, wherein at least a portion of the power received by the first device is wirelessly provided to the second device;

receiving an indication that a power transfer efficiency has dropped below a threshold for at least the first device or the second device; and when an updated load state is communicated between the first device and the second device:
causing a wireless redistribution of the power between the first device and the second device based on the updated load state.

13. The method as recited in claim 12, further comprising: establishing a communication channel between the first device and the second device based on the load states.

14. The method as recited in claim 13, wherein establishing the communication channel between the first device and the second device comprises determining a code pattern based on tuning and detuning between the first device and the second device.

15. A computing device, comprising:
a processor; and
a memory storing instructions that when executed by the processor cause the computing device to perform steps that include:
coupling a first electromagnetic field of the computing device to a first device;
coupling a second electromagnetic field of the computing device to a second device, wherein the first device is communicatively coupled to the second device;
receiving load states from the first device and the second device;
wirelessly distributing power to the first device and the second device in accordance with the load states, wherein at least a portion of the power received by the first device is wirelessly provided to the second device;
receiving an indication that a power transfer efficiency has dropped below a threshold for at least the first device or the second device; and
when an updated load state is communicated between the first device and the second device:
causing a wireless redistribution of the power between the first device and the second device based on the updated load state.

16. The computing device as recited in claim 15, wherein the steps further include:
establishing a communication channel between the first device and the second device based on the load states.

17. The computing device as recited in claim 16, wherein establishing the communication channel between the first device and the second device comprises determining a code pattern based on tuning and detuning between resonant circuits of the first device and the second device.

18. An apparatus, comprising:
a resonant circuit;
a processor; and
a memory storing instructions that when executed by the processor cause the apparatus to perform steps that include:
coupling a first electromagnetic field of a first device and the apparatus;
communicatively coupling to a second device, wherein the second device is coupled to the first device via a second electromagnetic field;
providing a load state to the first device;
receiving, based on the load state, wireless power from the first device;
providing wireless power to the second device;
providing feedback to the first device indicating that a power transfer efficiency has dropped below a threshold; and
when an updated load state is received from the second device:
causing a wireless redistribution of the power between the apparatus and the second device based on the updated load state.

19. The apparatus as recited in claim 18, wherein the steps include:
establishing a communication channel between the apparatus and the second device by determining a code pattern, wherein the code pattern is based on tuning and detuning between resonant circuits of the apparatus and the second device.

20. The apparatus as recited in claim 9, wherein the steps further include:
causing the resonant circuit of the apparatus to tune and detune to at least one of multiple frequency bands of the first device.

* * * * *